United States Patent [19]
Anton

[11] Patent Number: 5,224,292
[45] Date of Patent: Jul. 6, 1993

[54] FIBROUS MAT FOR GROWING PLANTS

[75] Inventor: Anthony Anton, Wilmington, Del.

[73] Assignee: E. I. Du Pont de Nemours and Company, Wilmington, Del.

[21] Appl. No.: 507,546

[22] Filed: Apr. 11, 1990

[51] Int. Cl.$^5$ ............................................. A01G 31/00
[52] U.S. Cl. ................................................ 47/64; 47/56
[58] Field of Search ................................. 47/64, 56, 95

[56] References Cited

U.S. PATENT DOCUMENTS

| | | |
|---|---|---|
| 2,923,023 | 2/1960 | Allen . |
| 2,976,646 | 3/1961 | Hansen et al. . |
| 3,225,125 | 12/1965 | Anderer et al. . |
| 3,557,491 | 1/1971 | Franklin et al. . |
| 3,772,137 | 11/1973 | Tolliver . |
| 3,831,317 | 8/1974 | Porte ........................................ 47/64 |
| 3,914,901 | 10/1975 | Muldner . |
| 4,066,490 | 1/1978 | Yoshimi . |
| 4,318,248 | 3/1982 | Muldner . |
| 4,357,780 | 11/1982 | Ball . |
| 4,364,197 | 12/1982 | Baron . |
| 4,777,763 | 10/1988 | Shannon et al. ......................... 47/64 |
| 4,805,343 | 2/1989 | Patterson et al. ....................... 47/81 |
| 4,972,627 | 11/1990 | Hori et al. ............................... 47/64 |

FOREIGN PATENT DOCUMENTS

| | | | |
|---|---|---|---|
| 8805256 | 7/1988 | PCT Int'l Appl. ..................... | 47/64 |
| 1367090 | 9/1974 | United Kingdom . | |
| 2036523 | 7/1980 | United Kingdom .................... | 47/64 |
| 2080083 | 2/1982 | United Kingdom .................... | 47/64 |

Primary Examiner—David A. Scherbel
Assistant Examiner—Joanne C. Downs

[57] ABSTRACT

A plant-growing nonwoven mat comprising a layer of hollow synthetic organic fibers having in their lumens water-soluble plant adjuvants, such as plant nutrients, fungicides, algaecides, weed killers, pesticides, and the like, provides slow release of the adjuvants to enhance and protect plant growth.

5 Claims, 1 Drawing Sheet

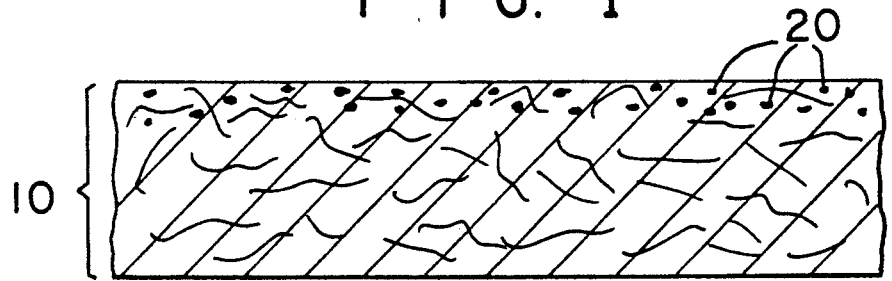
F I G. 1
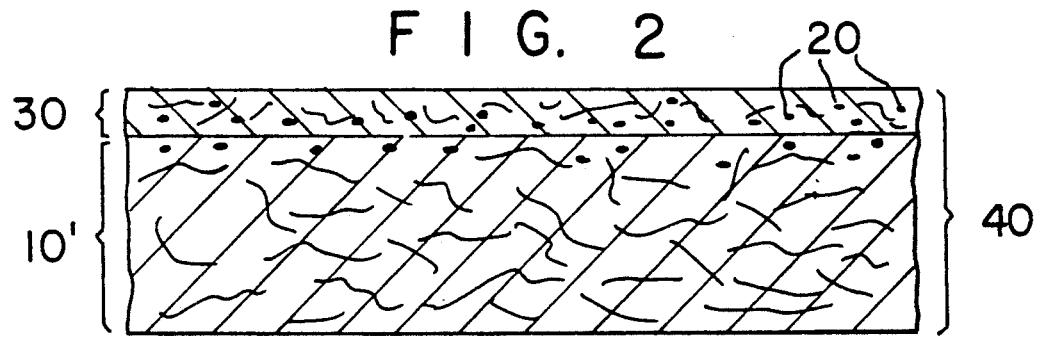
F I G. 2
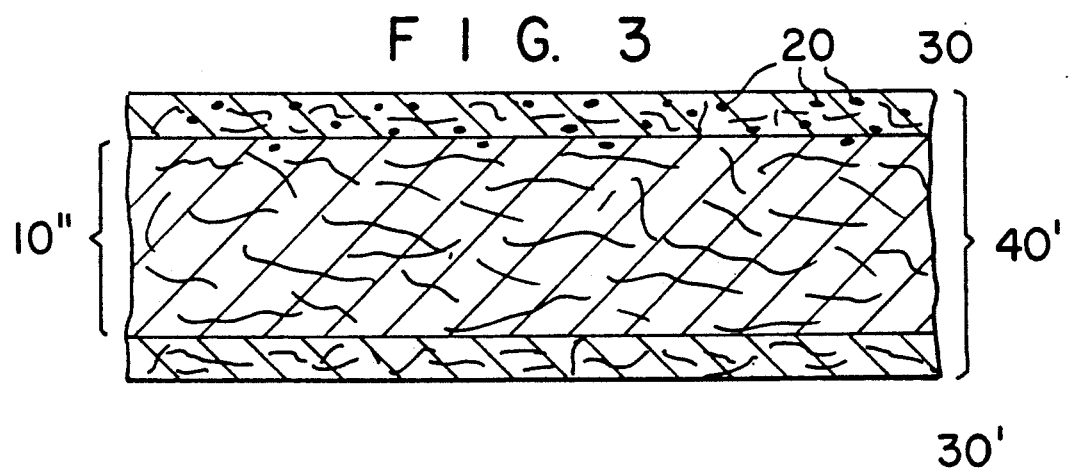
F I G. 3

FIBROUS MAT FOR GROWING PLANTS

BACKGROUND OF THE INVENTION

1. Field of the Invention

This invention relates to a fibrous nonwoven medium for growing plants from seeds. More particularly, the invention concerns such a medium which comprises a layer of hollow fibers of synthetic organic polymer. The medium, especially when its hollow fibers contain water-soluble adjuvants, can support, enhance and protect plant growth.

2. Description of the Prior Art

Non-woven mats or sheets composed of synthetic or natural fibers are known for growing plants directly over soil or in soil-less systems (such as hydroponic systems). U.S. Pat. No. 2,923,093 (Allen) discloses a seed-planting mat comprising multiple fibrous layers; one layer contains seeds; and all layers are needled together. U.S. Pat. No. 3,557,491 (Franklin et al) describes a nonwoven polyolefin sheet having a surface layer which contains seeds and is made of a water-soluble material or a gum containing a fertilizer. British Patent 1,367,090 discloses a seed-containing, rot-resistant fiber web for planting and reinforcing ground areas. U.S. Pat. No. 4,066,490 (Yoshimi) discloses a process and apparatus for making a lawn nursery strip which comprises sowing seeds on a strip of carded regenerated cellulose fibers, spraying a liquid fertilizer over the seeded surface, applying a liquid binder and finally press-bonding a net-like nonwoven material onto the surface. U.S. Pat. No. 4,357,780 (Ball) discloses spraying a soluble adhesive onto a mat of randomly oriented, unmodified, natural, straw-like cellulosic fibers and then depositing seeds and a water-soluble fertilizer thereon. Various other types of seed-bearing, plant-growing mats are disclosed in US. Pat. Nos. 2,976,646 (Hansen et al), 3,914,901 (Muldner), 4,318,248 (Muldner) and 4,363,197 (Baron).

Although the mats described in the above-cited patents can be used for growing plants, a fertilizer usually is sprayed onto the mat surface to provide plant nutrients. A mat with fertilizer on its surface usually requires special care in handling to avoid potential skin-irritation problems. Also, such surface-applied materials often are readily washed away by rain storms, which in turn, can lead to problems of soil and ground-water contamination. For best growth, plants need to be fed nutrients slowly.

A purpose of the present invention is to provide a seed and plant-growing fibrous medium that can alleviate the shortcomings of the known plant-growing media and can provide slowly releasable, water-soluble plant adjuvants.

SUMMARY OF THE INVENTION

This invention provides a plant-growing medium of synthetic organic fibers comprising a layer of hollow fibers containing a water-soluble plant adjuvant within lumens of the fibers. A preferred adjuvant is a plant fertilizer or nutrient. Optionally, the hollow fibers may contain other water-soluble adjuvants such as fungicides, algaecides, weed killers, pesticides and the like. Preferred hollow fibers are polyester fibers having lumens that amount to 10 to 40% of the fiber cross-section (i.e., a void fraction of 0.1 to 0.4).

In one preferred embodiment, the plant-growing medium is a nonwoven mat in which seeds are mechanically entangled. Generally, the hollow-fiber layer of the mat weighs in the range of 85 to 340 g/m$^2$ (2.5 to 10 oz/yd$^2$), has a density in the range of 0.01 to 0.08 g/cm$^3$ and is composed of hollow fibers in the range of 3 to 20 dtex having a void fraction in the range of 0.1 to 0.4. In a further preferred embodiment, the nonwoven mat is a composite comprising a surface layer of hydrophilic fibers (i.e., fibers that wick or absorb water) needled to the layer of hollow fibers. The hydrophilic fiber layer generally weighs in the range of 20 to 75 g/m$^2$ (0.6 to 2.2 oz/yd$^2$) and consists essentially of fibers in the range of 1 to 6 dtex.

The invention also provides a process for preparing a plant-growing medium comprising incorporating a water-soluble plant adjuvant within the lumens of a mass of hollow fibers of synthetic organic polymer and preparing a batt of the hollow fibers. In a preferred process, seeds are deposited atop the batt and the thusly assembled layers needled. In a further preferred embodiment of the process, a layer of hydrophilic fibers is needled to the layer of hollow fibers.

BRIEF DESCRIPTION OF THE DRAWINGS

The invention will be better understood by referring to the attached drawings in which FIG. 1 is a schematic cross-section of a plant-growing medium in the form of a needled mat 10 of hollow fibers in accordance with the invention, the mat containing seeds 20; and FIGS. 2 and 3 are schematic cross-sections of preferred embodiments in the form of needled composite mat 40 and 40', wherein 10' and 10" are each a layer of hollow fibers, 30 and 30' are each an outer layer of hydrophilic fibers and 20 are seeds.

DETAILED DESCRIPTION OF PREFERRED EMBODIMENTS

The following description and examples are included for the purposes illustrating preferred embodiments of the invention and are not intended to limit its scope, which is defined by the appended claims.

In its simplest form the plant-growing medium of the invention comprises a mat of hollow fibers of synthetic organic polymers, the lumens of the fibers containing a plant adjuvant.

Various types of synthetic organic polymers are suitable for the hollow fibers of the plant-growing medium of the invention. As used herein, the term "synthetic organic polymers" includes polymers such as polyesters, polyolefins, nylons, acrylics and the like, as well as polymers derived from cellulose such as viscose rayon, cellulose acetate fibers, and the like. Rayon is preferred when relatively rapid biodegradability is desired. A preferred polymer for the hollow fibers is polyester because of its availability in commercial quantities. Hollofil ®, sold by E. I. du Pont de Nemours and Company provides such a commercial fiber. The hollow fibers for use in the plant-growing medium of the invention, generally are in the range of 3 to 15 dtex, of roughly circular cross-section, and of 0.1 to 0.4 void fraction (i.e., the fraction of the total cross-section occupied by the axial lumen). The fibers generally are cut into lengths in the range of 0.6 to 15 cm, preferably 1 to 2.5 cm. Melt-spinning of such hollow fibers is disclosed for example in U.S. Pat. No. 3,772,137 (Tolliver). Dry spinning of hollow fibers is disclosed in U.S. Pat. No. 3,225,125, (Anderer et al).

For optimum subsequent filling of the fibers with water-soluble adjuvants, fibers with cleanly cut ends are usually needed. Various methods of cutting the hollow fibers are available, such as blade shear cutting, stretch breaking, water-jet cutting, ultrasonic cutting, laser cutting and the like. Low energy cutting usually leaves the fiber lumen free of cutting debris and is therefore preferred. Such cutting is available commercially from MiniFibers, Inc. of Johnson City, Tenn., which employs cutters of the type disclosed in U.S. Pat. No. 3,768,355 (Farmer et al).

The tiny axial lumens of the cut hollow fibers can be filled with variety of water-soluble plant adjuvants. The fiber lumens can be filled with liquids or aqueous solutions containing the water-soluble adjuvants. The filling process comprises the sequential steps of (a) placing cut hollow fibers in a chamber;
(b) evacuating the chamber;
(c) filling the chamber with a liquid or solution containing the water-soluble adjuvant;
(d) increasing the pressure on the system to above atmospheric pressure (e.g., to about 5 atmospheres);
(e) releasing the pressure;
(f) removing the fibers;
(g) optionally rinsing the fibers with water; and
(h) drying the fibers to leave a water-soluble residue within the lumens of the hollow fibers.

Generally, the dry adjuvant amounts to about 0.5 to 15%, preferably 2 to 5%, of the total weight of the hollow fiber.

Methods similar to the above-described process of filling the hollow fibers with adjuvant have been used for the deep impregnation of porous articles, such as electrical windings, printed circuit boards, and other electrical components, metal castings, plastics, wood, etc. Similar methods also have been described for impregnating hollow fibers with a variety of liquids and mixtures. However, the known methods generally were not adequate for filling the hollow fibers in large quantities, such as are desirable for use on a commercial scale. However, a system for use with hollow staple fibers, was designed and built by Gaston County Machine Company of Stanley, N.C.

Water-soluble adjuvants for use in preferred embodiments of the invention include nutrients, fertilizers, fungicides, algaecides, weed killers, pesticides and the like. Numerous water-soluble plant fertilizers or nutrients are available commercially (e.g., Peters Plant Food, used in the examples below). Suitable fungicides include benomyl and other benzimidazoles (e.g., Benlate ® sold by E. I. du Pont de Nemours & Co.), flusilazole and other triazoles (e.g., Nustar ® sold by E. I. du Pont de Nemours & Co.), metalaxyl and other acylalanines (e.g., Ridomil ® sold by Ciba-Geigy Corp.), and tridemorph and other morphlines (e.g., Calixine ® sold by BASF), among others. Suitable insecticides include oxamyl and other related carbamates (e.g., Vydate ® sold by E. I. du Pont de Nemours & Co.), acephate (e.g., Orthene ® sold by Chevron Chemical Co.), resmethrin and other pyrethroids (e.g., Synthrine ® sold by Fairfield American Corp.), among others. Suitable herbicides include chlorsulfuron and other sulfonylureas (e.g., Glean ® sold by E. I. du Pont de Nemours & Co.) among others. Combinations of fungicides, insecticides and fertilizers help protect young germinating seedling plants from disease and insect damage while supplying needed nutrients. Herbicides can be incorporated into the growing medium to selectively favor the desired plant species and selectively remove undesirable vegetation.

The thusly filled fibers can be formed into a mat by any of several well known conventional processes. In the examples, the batts are carded webs formed by conventional carding. Such batts or webs, with or without water-soluble adjuvants in the fiber lumens and optionally layered with conventionally carded batts of hydrophilic fibers, are mechanically needled on a Dilo needle loom, into non-woven mats of desired thickness and density for use in the invention. This operation, which is often referred to as felting, increases the density of the batt. Generally the density of the final mat is in the range of 0.01 to 0.08 g/cm$^3$, but preferably is in the range of 0.02 to 0.05 g/cm$^3$.

Although it is possible to fill the hollow fibers with adjuvants after they have been formed into needled mats, it is much preferred to fill the fibers before carding, as masses of loose, opened cut fibers. In the latter condition, the fiber ends are more readily accessible to the infiltrating liquid than after the fibers have been formed into a more dense needled mat.

Thin carded batts of conventional synthetic organic fibers of textile decitex, preferably hydrophilic fibers, can be needled to the top and/or bottom of the hollow fibers layer to form composite mats as shown in FIGS. 2 and 3. Such constructions help deliver water throughout the batt by wicking and/or absorption. Among suitable hydrophilic synthetic organic polymers for use in the present invention are fibers of regenerated cellulose, poly-α-caproamide (i.e., 6-nylon), acrylic terpolymer (e.g., 94/6/0.12 acrylonitrile/methyl acrylate/sodium styrene sulfonate), acrylic copolymer (e.g., 94/6 acrylonitrile/sodium styrene sulfonate), and the like. Various surface agents to assist water wicking can be used on the fibers, provided the agents do not detrimentally affect seeds or sprouted seedling plants. Generally, seeds are distributed on top of the the hollow fiber layer before either of the hydrophilic fiber batts are needled to the hollow fiber layer to form the composite mat. During needling, the seeds become entrapped and entangled with the fibers.

The plant-growing medium of the invention usually is formed into a nonwoven sheet or mat of any convenient size. Usually, the mat is about 0.5 to 3 cm thick However, thicker mats can be formed by stacking them upon each other and lightly needling them together. In another embodiment, the plant-growing medium is cut or formed in the shape of a cylinder, cone, pyramid, parallelepiped or frustum thereof. These shapes are referred to herein as "plugs" and are included in the general term "plant-growing medium". Usually, the maximum diameter of a plug is about 6 centimeters. Plugs are particularly suited for transplanting operations once the seeds have sprouted into robust seedling plants. The medium permits good anchoring of the growing roots in the mat or plug. When transplanted, the nonwoven fibrous medium still provides a good anchor for the roots. In addition, the medium provides desirable aeration around the roots because of its low density and hollow fibers.

The nonwoven mats can be made to any thickness and cut into plugs or used as sheets. Unlike common soil, Vermiculite, peat moss or the more commercial "rockwool" cubes and polyurethane plant-growing blocks, the needled fibrous medium of the invention does no have to be contained. It can maintain its own shape and integrity, as well as conform to ground contours. The medium sustains plant growth and does not damage the root system. Because the medium is made of 100% synthetic fibers that do not require chemical surface binders or finishes, the medium can be a "sterile" and particularly suited for growing sensitive plants.

Needled nonwoven fibrous growing media of the invention containing water-soluble nutrients and other adjuvants within the lumens of the hollow fibers are safe to handle. The plant-growing media can be stored substantially indefinitely. The adjuvant is released only when it is contacted and leached out by water. Thus, in plant-growing situations, adjuvant is released quite slowly from the hollow fibers, each time the seeds or plants are watered.

EXAMPLES 1-3

These examples describe the fabrication of plant-growing mats of the invention and demonstrate their superiority over known mats intended for the same purpose. Examples 1 and 2 describe hollow fiber mats of the invention. Example 3 describes a composite mat of the invention.

In each of the Examples, the use of adjuvant within the hollow fiber lumens is illustrated with a water-soluble plant nutrient, Peter's General Purpose 20-20-20 Soluble Plant Food, sold by Robert B. Peter Co., Inc., of Allentown, Pa. Fibers were filled with aqueous solutions having a nutrient concentration of 0.0, 0.6 or 50%, as follows. A load of 350 to 400 grams of 1-inch (2.54-cm) long, 7.7-dtex (7-dpf) hollow polyester fibers, each having one axial lumen which occupied about 15% of the total cross-section of the fiber, was loaded into a pressure vessel of 2.5-liter capacity. The pressure in the vessel was reduced to 1 torr or less. Aqueous nutrient solution was supplied to the evacuated vessel in a sufficient quantity to fully cover all the fibers in the vessel. The supply line was then closed. The vessel was warmed and its internal pressure increased to 90 psi (620 kiloPasca)s). As filling of the fiber lumens progressed, the height of the solution in the vessel became lower. This was observed through a glass level gauge attached to the vessel. After the liquid height reached a steady level, the pressure in the vessel was returned to atmospheric, the vessel was opened, and the fibers were removed. The fibers were then dried, rinsed with about four liters of cold water, and dried again.

Several batches of hollow fibers, prepared as described in the preceding paragraph, were combined and carded into batts, each weighing about 100 g/m$^2$ and measuring about 0.5-inch (1.3-cm) thick. One to five such carded batts were assembled, one atop the other, and needled together with a Dilo needle-loom to form the hollow fiber mats of Examples 1 and 2.

For comparison purposes, mats were formed from hollow fibers as in Examples 1 and 2, except that the fibers contained no adjuvant (Comparison A). A second comparison sample (Comparison B) was prepared from a needled batt of solid staple fibers of polypropylene, the batt having a weight of about 4 oz/yd$^2$ (135 g/m$^2$), a thickness of about 0.13-inch (0.33-cm) and a density of about 2.75 lb/ft (0.044 g/cm$^3$).

Samples measuring 12 by 12 inches (30.5 by 30.5 cm) were cut from the mats. Rice or cucumber seeds were distributed atop the thusly prepared hollow fiber mat. Rice seeds are particularly useful for the tests because their growth is very dependent on plant nutrient. Insufficient nutrient results in a reduction of the usual deep green coloration of the rice plant and causes partial yellowing of the plant.

For Example 3, a composite mat of the invention was formed as follows. Two layers of hollow fibers of Example 1 were assembled. Seeds were distributed atop the upper hollow fiber layer. A thin layer of solid (i.e., not hollow) acrylic staple fibers was placed atop the seeds. A thin layer of acrylic fibers was also placed below the hollow fiber mat. The acrylic fibers were Type 42 Orlon ® staple fibers of 3 denier (3.3 dtex) and about 2.5-inch (6.3-cm) length. The entire assembly was lightly needled to form a composite plant-growing mat of the invention. The thusly formed composite mat had a hollow fiber layer weighing about 190 g/m$^2$, each acrylic fiber layer weighing about 25 g/m$^2$, a total mat thickness of about 0.19 inch (0.5 cm), and a density of about 3.1 lb/ft$^3$ (0.05 g/cm$^3$). A very similar composite mat was formed with the hollow fiber layers of Comparison A to form a composite comparison sample (Comparison C) in which the fibers contained no nutrient, each acrylic fiber layer weighed about 35 g/m$^2$, total mat thickness was about 0.16 inch (0.4 cm), and mat density was about 4.0 lb/ft$^3$ (0.06 g/cm$^3$). The composite mats were then cut into pieces measuring 12 by 12 inches (30.5 by 30.5 cm) and prepared for plant-growth tests.

Plant-growth tests were conducted with the seeded mats of Examples 1-3 and Comparison Samples A-C under controlled conditions on greenhouse tables in a greenhouse located in Newark, Del. Temperatures were maintained at 20° to 30° C. and relative humidity at 70 to 85% and the mats received a minimum of 14 hours of daylight per day (supplemented with metal-halide lights). In these tests, water was pumped to the mats by a conventional watering system. After three weeks growth in the greenhouse, the plants were examined visually and rated. The rice plants were rated for green coloration.

Plants grew larger and better on the sample mats of Example 1, which had a high concentration of water-soluble nutrient deposited in the lumens of the hollow fibers of the mats, as compared to the plants grown on the hollow-fiber mats of Example 2, which had a low concentration of adjuvant in the lumens of its fibers. However, the plants on the mats of Example 2 grew somewhat better than those grown on the mats which had no adjuvants in the fibers (Comparison Samples A and B). Plants grown on samples of the composite mat of the invention of Example 3 were greener, larger and stronger than those grown on the composite mat of Comparison C which had no adjuvant in its hollow fiber lumens.

Overall, plants grown on mats that included layers of hollow fibers that contained nutrient within the lumens of the hollow fibers, had more vigorous, greener, larger and generally better plant growth than those grown on comparison mats. The hollow fiber mats that had the highest concentration of nutrient in the fiber lumens provided the best plant growing results.

The tests of the composite mats and simple hollow fiber mats of the invention clearly demonstrated that the water-soluble adjuvant contained in the hollow fibers could be leached or wicked out of the cut ends of the fibers slowly and efficiently to nourish the root systems of sprouting seedlings. Surprisingly, when the mat was watered, enough adjuvant apparently migrated from the fiber to the roots to promote healthy plant growth.

EXAMPLE 4

This example describes composite mats of the invention that were subjected to outdoor plant-growing tests.

Grass seeds were placed atop a hollow-fiber batt of Example 1. The batt contained water-soluble plant food in the lumens of the fibers, was about 1.4-cm thick and weighed about 100 g/m$^2$. Grass seeds were sprinkled on top of the hollow fiber batt. A carded batt of 3.3-dtex nylon staple fibers (T-200, sold by E. I. du Pont de Nemours & Co.) of 0.3-cm thickness and 40-g/m$^2$ weight, was then needled on top of the seeded hollow fiber batt to form the composite mat of Example 4. The composite mat had a final thickness of about 0.9 cm and a density of about 0.016 g/cm$^3$. The composite was cut into samples measuring about 10 cm by 20 cm. Mat samples were then installed outdoors over clay-rich Delaware soil. The test was started in June and was monitored for one year. Grass began to grow within a month, flourished during the summer and early fall, became dormant during winter and grew again the following spring.

The test demonstrated that mats of the invention support plant growth very well, even when they are used atop a clay-rich soil.

I claim:

1. A plant-growing medium comprising a layer of hollow polyester fibers having lumens amounting to 10 to 40% of the fiber cross-section and containing within the lumens a water-soluble plant adjuvant having a dry weight amounting to 0.5 to 15% of the total weight of the hollow fibers 2. A plant-growing medium in accordance with claim 1 wherein the water-soluble plant adjuvant is selected from the group consisting of plant nutrients, fertilizers, fungicides, algaecides, weed killers, pesticides and combinations thereof.

3. A plant-growing medium in accordance with claim 1 wherein the water-soluble adjuvant is a plant nutrient.

4. A plant-growing medium in accordance with any of claims 1, 2 or 3 wherein the plant-growing medium is a nonwoven mat in which seeds are mechanically entangled and the hollow-fiber layer of the mat weighs in the range of 85 to 340 g/m$^2$, has a density in the range of 0.01 to 0.080 g/cm$^3$ and comprises hollow fibers in the range of 3 to 20 dtex.

5. A plant-growing medium in accordance with claim 4 wherein the nonwoven mat is a composite comprising a surface layer of hydrophilic fibers needled to the layer of hollow fibers, said hydrophilic fiber layer weighing in the range of 20 to 75 g/m$^2$ and comprising fibers in the range of 1 to 6 dtex and the dry adjuvant amounting to 2 to 5% of the fiber weight.

* * * * *